Nov. 10, 1970  J. B. BRIGGS  3,539,932
CIRCUITS AND METHODS FOR MEASURING THE AMPLITUDE
OF PLURAL SIGNALS
Filed June 14, 1966
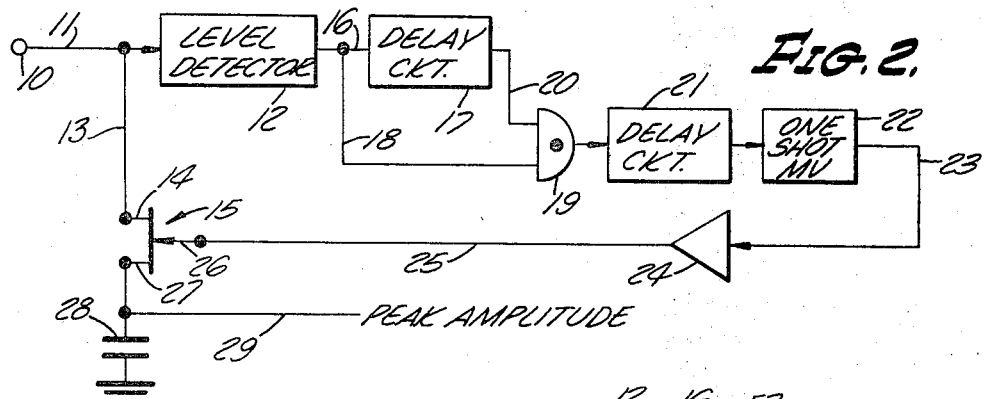
FIG. 2.
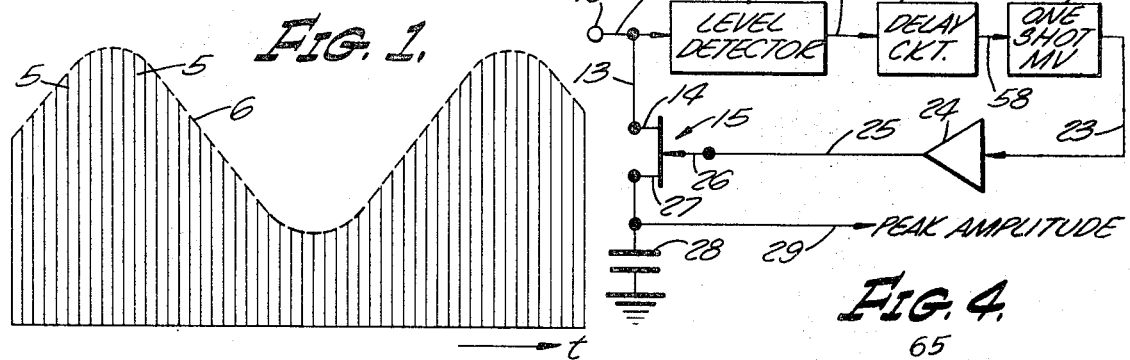
FIG. 1.
FIG. 4.
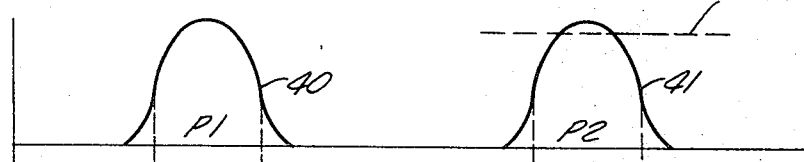
FIG. 3A.
FIG. 3B.
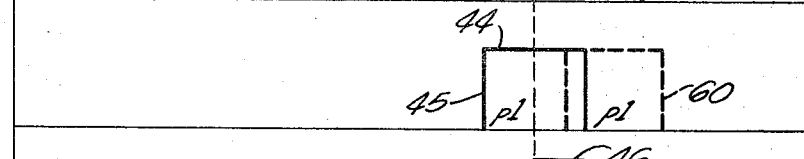
FIG. 3C.
FIG. 3D.
FIG. 3E.
FIG. 3F.
INVENTOR.
JAMES B. BRIGGS
BY Lyon & Lyon
ATTORNEYS United States Patent Office 3,539,932
Patented Nov. 10, 1970

3,539,932
CIRCUITS AND METHODS FOR MEASURING THE
AMPLITUDE OF PLURAL SIGNALS
James B. Briggs, La Crescenta, Calif., assignor to Hoffman Electronics Corporation, El Monte, Calif., a corporation of California
Filed June 14, 1966, Ser. No. 557,558
Int. Cl. H03k 17/00
U.S. Cl. 328—151                    10 Claims

ABSTRACT OF THE DISCLOSURE

Several circuits and methods are disclosed for measuring the peak amplitude of pulses and providing an output signal which follows the peak amplitude thereof. Several circuits are disclosed which receive plural signals occurring in signal pairs having a predetermined spacing between the signals of the pairs, and wherein a delayed first signal of each pair is used to generate a trigger pulse which in turn is used to sample the peak amplitude of the second pulse of the respective pair. With one circuit the first pulse is delayed slightly less than the spacing between the signal pairs, and in another circuit the first pulse is delayed slightly greater than the spacing. In each instance the resulting delayed pulses are employed to generate trigger pulses for sampling purposes. In another embodiment, the peak amplitudes of signals of given width may be measured by using each signal to generate a sampling signal which in turn samples the peak amplitude of the signal.

The present invention relates to pulse amplitude measurement and more particularly to a circuit for measuring or following the peak amplitude of pulses.

A number of circuits have been devised for following the peak amplitude of signals or pulses. Typically these circuits are called peak riding detectors or "boxcar" detectors. The simplest of these circuits employ a capacitor which is charged through a diode to a voltage proportional to pulse amplitude. However, these circuits cannot accurately follow the changing amplitude of various pulses because of the inability of the pulses to suitably discharge the capacitor through the diode to a lower value proportional to a low level pulse after the capacitor has been charged by a high level pulse. Accordingly, the general circuits of this nature utilize some means to discharge the capacitor to a predetermined level, such as zero, prior to the occurrence of each new pulse. In this manner, the charge on the capacitor can follow the general amplitude of the various pulses applied thereto. However, because of the periodic discharge of the capacitor, pulse spikes are produced which must be filtered to provide an average output waveform. These spikes are detrimental in many applications because of the transient nature thereof, and if they are completely filtered drift and phase errors may occur.

Accordingly, it is an object of the present invention to provide an improved pulse amplitude measuring circuit.

Another object is to provide an improved measuring circuit for following the amplitude of a pulse pattern while ignoring spurious single pulses and noise.

An additional object of the present invention is to provide a pulse amplitude measuring circuit for following the peak amplitude of pulses.

A further object of the present invention is the provision of a measuring circuit for following the amplitude of pulses without the requirement of periodically discharging a capacitor.

These and other objects and advantages of the present invention will become more apparent upon reference to the accompanying description and drawings in which:

FIG. 1 illustrates a plurality of variable amplitude pulses from which a pulse amplitude waveform may be derived by the circuit of the invention;

FIG. 2 illustrates a pulse amplitude measurement circuit according to the present invention;

FIGS. 3A through 3F are pulse diagrams illustrating the pulse waveforms encountered in the circuit of FIG. 1; and FIG. 4 is an alternative circuit.

In accordance with a preferred embodiment of the present invention, the first arriving pulse of a pair of pulses is delayed and utilized to sample the amplitude of a second arriving pulse of the pair. The first pulse is essentially shaped and delayed, and then employed to operate a trigger or pulse circuit, such as a one shot multivibrator. The output of the trigger circuit is used to control a switch which passes a portion of the second pulse of the pair to charge or discharge a capacitor during the peak of the second pulse. The charge on the capacitor follows the level of the second pulse of each pair of pulses.

Although not intending to be limited thereby, the pulse amplitude measuring circuit of the present invention is particularly useful for following the amplitude of pulse pairs generated by the beacon in a radio air navigation system, such as a TACAN system, in the measurement of the azimuth or bearing of an airplane with respect to the beacon. For bearing measurements by a TACAN system, the beacon transmits a cardioid radiation pattern rotated at the rate of 15 rotations per second. This cardioid pattern is produced by generating a plurality of pairs of pulses. A sine wave results if the rotating cardioid pattern is converted into rectangular coordinates. The pairs of pulses forming the sine wave are received by the airborne receiver, and the resulting sine wave is a 15 cycles per second signal which provides a coarse indication of bearings. The beacon antenna also generates nine secondary variations or ripples superimposed on the cardioid pattern. These secondary ripples form a sine wave of 135 cycles per second superimposed on the 15 cycles per second sine wave. In order to provide bearing information, the pulses generated by the beacon which create the cardioid pattern and secondary variations must be detected and converted into the composite waveform comprising the 135 cycles per second sine wave superimposed on the 15 cycles per second sine wave. The present invention provides a novel and relatively simple circuit for providing an output composite waveform which follows the peak amplitude of the generated pulses.

Reference may be made to copending U.S. patent application Ser. No. 557,441, filed June 14, 1966, entitled "Phase Angle Measurement System," filed concurrently herewith by applicant, for a general discussion of such a radio air navigation system. The copending application, the disclosure of which is incorporated herein by reference, describes a system for measuring phase angle and is particularly useful in measuring the 15 c.p.s. and 135 c.p.s. component of a composite waveform to provide bearing information pertaining to the bearing of an airplane with respect to a ground beacon. The instant application discloses a circuit for converting received pulses into a waveform which may be used in the operation of the system described in said copending application.

FIG. 1 illustrates a plurality of variable amplitude pulses 5, the peak amplitude of which represent a sine wave 6. This sine wave may represent the radiated cardioid pattern from a beacon as converted into rectangular coordinates, but is shown without the secondary 135 c.p.s. sine wave superimposed thereon for simplicity of illustration. The sine wave 6 is formed by a plurality of varying amplitude pulses 5, each of which actually represents a pair of pulses. In an air radio navigation system, these pulses typically are three and one-half microseconds wide, the pulses of a pair are spaced apart twelve microseconds and the average spacing between pulse pairs is three hundred thirty microseconds. These pulses are received by the airborne receiver, it being understood that many more such pulses may be transmitted and received than are shown in FIG. 1. Although not limited to this particular pulse amplitude measuring application the circuit of the present invention receives pulses, such as the pulse pairs 5, to provide an output waveform, such as the sine wave 6, following the peak amplitude of the pulses.

Referring now to FIG. 2, an input terminal 10 is connected through a line 11 to the input of a level detector 12 and through a line 13 to one electrode 14 of a field effect transistor 15. The input terminal 10 is connected to a source of pulses, the peak amplitude of which are to be measured. In a TACAN system, for example, the terminal 10 is connected to the airborne TACAN receiver which receives the pulses transmitted from the beacon as described previously. The level detector 12 is a conventional circuit which converts each input pulse into a digital signal of standard shape, and may comprise a conventional circuit for detecting the point at which the amplitude of the input pulse exceeds a certain level.

The output of the level detector is connected through a line 16 to a delay circuit 17, and through a line 18 to the input of an "and" gate 19. The output of the delay circuit 17 is connected through a line 20 to an input of the gate 19. The delay circuit 17 may take any of various forms, such as a conventional delay line or a clocked counter. The delay circuit 17 provides a delay slightly less than the spacing between the pulse pairs applied to the input terminal as will be explained in greater detail subsequently.

The output of the gate 19 is connected through a delay circuit 21 to the input of a trigger circuit, such as a one-shot multivibrator 22. The delay circuit 21 slightly delays the output of the gate 19, and the multivibrator 19 triggers on the leading edge of the output pulse from the delay circuit 21. The multivibrator 22 provides a short switching pulse through a line 23, an amplifier 24, and a line 25 to the gate electrode 26 of the field effect transistor 15. The remaining electrode 27 of the field effect transistor 15 is connected through a capacitor 28 to ground, and to an output line 29.

FIGS. 3A through 3D illustrate the various pulse waveforms involved in the operation of the circuit of FIG. 2. First and second pulses 40 and 41 of a pulse pair applied to input terminal 10 are shown in FIG. 3A. It will be appreciated that although only a single pair of such pulses is illustrated, a larger number of such pulse pairs which vary in amplitude, make up the waveform illustrated in FIG. 1. FIG. 3B illustrates pulses 42 and 43 which are applied by the level detector 12 to the delay circuit 17 and gate 19, and are standardized pulses corresponding to the respective pulses 40 and 41. A pulse 44 shown in FIG. 3C corresponds to the pulse 42 shown in FIG. 3B after it has been delayed by the delay circuit 17. As mentioned previously, the delay provided by the circuit 17 preferably is slightly shorter than the spacing between the pulses 40 and 41. Thus, the leading edge 45 of the pulse 44 occurs before the leading edge of the pulse 43, and the pulse 44 brackets the first portion of the pulse 43. A typical duration for each of the pulses 42 through 44 is approximately three and one-half microseconds and, thus, the leading edge of the pulse 44 may occur approximately one microsecond before the leading edge of the pulse 43.

The "and" gate 19 provides an output pulse 46 as shown in FIG. 3D which in turn is delayed by the delay circuit 21 to provide a pulse 47 as shown in FIG. 3E. The delay provided by the circuit 21 is short, and is selected to cause the leading edge of the pulse 47 to occur slightly before the peak of the second pulse 41 of the pulse pair. The multivibrator 22 triggers on the leading edge of the pulse 47 from the delay circuit 21 and provides an output switching pulse 48 as shown in FIG. 3F. Preferably, this pulse 48 terminates slightly after the peak of the pulse 41 and, hence, is approximately one microsecond long. The duration of the pulse 48 is readily determined by the selection of the time constant of the multivibrator 22.

The pulse 48 is amplified by the amplifier 24 and employed to turn on the transistor 15. As can be seen from FIGS. 3A and 3F, the switching pulse 48 brackets, or occurs during, the peak of the pulse 41. Thus, the pulse 48 essentially is employed to sample the peak amplitude of the second pulse 41 of the pulse pair.

The capacitor 28 charges to this peak amplitude, and the transistor 15 is turned off at the termination of the pulse 48. Although not shown, an amplifier may be used between the electrode 27 of the transistor 15 and the capacitor 28, if desired, to obtain a larger signal level to drive or charge the capacitor 28.

As the next pulse pair arrives, the above process (switching of the transistor 15 and charging of the capacitor 28) is repeated, and the capacitor 28 charges to a new value. This process continues, with the charge on the capacitor following the peak amplitude of the second pulse of each pair either up or down depending upon the magnitude of the second pulses of the pairs since no diode or the like is in series with the capacitor 28 to prevent current flow in one direction. The amplitudes of pulse pairs, or pulse patterns, is accurately followed while ignoring single pulses of any amplitude and also noise. Preferably, the source impedance connected to the input terminal 10 is low to allow rapid charging or discharging of the capacitor 28. The resulting waveform is available on the line 29.

Where the pulse spacing between the pulses of a pulse pair is precise compared to the pulse width, an alternative circuit as shown in FIG. 4 may be used. Like reference numerals are employed to designate the same components shown in FIG. 2. Thus, the input terminal 10 is connected through the line 11 to the level detector 12 and to the electrode 14 of the field effect transistor 15. The output of the level detector 12 is connected through a line 16 to a delay circuit 57, the output of which is applied through a line 58 to the one-shot multivibrator 22. The output of the multivibrator 22 is connected through the line 23, the amplifier 24 and the line 25 to the gate electrode 26 of the transistor 15, as in FIG. 2. The delay circuit 57 provides a delay slightly greater than the spacing between the pulse pairs applied to the input terminal 10, and provides an output pulse 60 as shown in dashed lines in FIG. 3C. The multivibrator 22 triggers on the leading edge of the pulse 60 to provide the switching pulse 48 shown in FIG. 3F. The delay provided by the delay circuit 57 is selected to cause the leading edge of the pulse 60 to occur slightly before the peak of the second pulse 41 shown in FIG. 3A. Hence, the circuit shown in FIG. 4 provides a switching pulse 48 for sampling the peak of the second pulse 41 of each pair. The sample time, that is the duration of the pulse 48, can be precisely defined where the pulse spacing and pulse width of the input pulse pairs are precise. Alternatively, this circuit may be used to follow the amplitude of single pulses if the delay provided by the circuit 57 is made quite short; for example, approximately one microsecond for the three and one-half microsecond pulses of the nature discussed above.

In certain applications the pulses 40 and 41 may be accompanied by a substantial amount of noise, such as occasioned by the thermal noise in a receiver coupled to the input of the circuit in FIG. 2. A noise pulse may exceed the reference level, such as a fifty percent level, established by the level detector 12 thereby causing an early generation of a switching pulse applied to the transistor 15. This may be remedied in a simple manner by employing an additional level detector for detecting an upper portion of an input pulse to cause the gating of the output of the delay circuit 21 to the multivibrator 22. For example, a level detector to which the pulses 40 and 41 are applied may provide an output pulse during the time these pulses exceed ninety percent of their normal level as indicated by a dashed line 65 in FIG. 3A. The output of this additional level detector is applied to one input of a conventional "and" circuit, like the circuit 19, along with the output of the delay circuit 21. The output of the additional "and" circuit is applied to the input of the multivibrator 22 instead of the output of the delay circuit 21 being applied directly thereto. The output pulse 47 shown in FIG. 3E from the delay circuit 21 thus does not trigger the multivibrator 22 unless the amplitude of the pulse 41 reaches the established ninety percent level indicated by dashed line 65 and determined by the additional level detector. Stated differently, if the output of the additional level detector is true thereby indicating that the pulse 41 reached the ninety percent level, it enables the output of the delay circuit 21 to be applied to the one shot multivibrator 22. The remainder of the circuit operates in the same manner described above except that spurious noise signals which may cause an output from the level detector 12 do not cause the generation of a switching signal to the transistor 15 unless an input pulse reaches the normal ninety percent level established by the additional level detector.

Either of the circuits of FIGS. 2 or 4 may be used in a navigation system as described previously. Additionally, the output line 29 of either of these circuits may be used to provide a negative feedback signal to the airborne receiver for adjusting the gain thereof. This provides a very high gain feedback device in which the gain of the receiver is controlled.

While the present invention has been described in connection with use in a radio air navigation system, it should be understood that other applications are possible. The invention, therefore, may be embodied in other forms not departing from the spirit or central characteristics thereof. The present embodiments are to be considered in all respects as illustrative and not restrictive, the scope of the invention being indicated by the appended claims rather than by the foregoing description and all changes which come within the meaning and range of equivalency of the claims are therefore intended to be embraced thereby.

What is claimed is:

1. A circuit for measuring the amplitude of plural signals occurring in signal pairs having a predetermited spacing between the signals of each pair wherein the first signal of each pair is utilized to sample the amplitude of the second signal of each pair for providing an output signal which follows the peak amplitude of the second signals of the pairs comprising
   an input for receiving said plural signal pairs,
   delay circuit means coupled with said input for receiving the signal pairs and for delaying each first signal of said signal pairs by a delay slightly less than said spacing between the signals of said signal pairs to cause each delayed first signal to overlap the leading edge of the respective second signal of each signal pair,
   trigger circuit means coupled with said delay circuit means to receive said delayed first signal and said second signal of each signal pair and to provide trigger pulses which respectively bracket the peaks of said second signal of each signal pairs, said trigger circuit means comprising gate means receiving said delayed first signal and said second signal of each signal pair and providing an output control signal during coincidence thereof, a second delay circuit means responsive to said control signal for imposing a slight delay on said output control signal, said slight delay being substantially less than the spacing between the signals of said signal pairs, and a trigger circuit responsive to said delayed control signal which occurs for each signal pair for providing said trigger pulses, and
   switching and storage means coupled to said input and coupled with said trigger circuit means for providing output signals during the peak of each of the second signals of said signal pairs, said switching and storage means responsive to said trigger pulses for passing the peaks of said second signals of said signal pairs to provide said output signal which follows the peak amplitude of the second signals of the pairs.

2. A circuit for measuring the amplitude of plural signals occurring in signal pairs having a predetermined spacing between the signals of each pair wherein the first signal of each pair is utilized to sample the amplitude of the second signal of each pair for providing an output signal which follows the peak amplitude of the second signals of the pairs comprising
   an input for receiving said plural signal pairs,
   delay circuit means coupled with said input for receiving the signal pairs and for delaying each first signal of said signal pairs by a delay slightly less than said spacing between the signals of said signal pairs to cause each delayed first signal to overlap the leading edge of the respective second signal of each signal pair,
   trigger circuit means coupled with said delay circuit means to receive said delayed first signal and said second signal of each signal pair and to provide trigger pulses which respectively bracket the peaks of said second signal of each signal pair, said trigger circuit means comprising gate means receiving said delayed first signal and said second signal of each signal pair and providing a first control signal during coincidence thereof, a second delay circuit means responsive to said first control signal for imposing a slight delay on said first control signal to provide a second control signal the leading edge of which occurs after the leading edge of said first control signal but before the peak of the second signal of each respective signal pair, said slight delay being substantially less than the spacing between the signals of said signal pairs, and a trigger circuit responsive to said second control signal which occurs for each signal pair for providing said trigger pulses, and
   switching and storage means coupled to said input and coupled with said trigger circuit means for providing output signals during the peak of each of the second signals of said signal pairs, said switching and storage means responsive to said trigger pulses for passing the peaks of said second signals of said signal pairs to provide said output signal which follows the peak amplitude of the second signals of the pairs.

3. A circuit for measuring the amplitude of plural signals occurring in signal pairs having a predetermined spacing between the signals of each pair wherein the first signal of each pair is utilized to sample the amplitude of the second signal of each pair for providing an output signal which follows the peak amplitude of the second signals of the pairs comprising
   an input for receiving said plural signal pairs,
   level detector means coupled with said input for receiving said signal pairs and providing standardized pulse pairs respectively corresponding to said signal pairs,
   delay circuit means coupled with said level detector means for receiving the output of said level detector means and delaying each first pulse by a delay slightly less than said spacing between said signals of said signal pairs to cause each delayed first pulse to overlap the leading edge of the repective second pulse of each pulse pair,
   trigger circuit means coupled with said delay circuit means to receive said delayed first pulse and said second pulse of each pulse pair and to provide trigger pulses which respectively bracket the peaks of said second signal of each signal pair, said trigger circuit means comprising gate means receiving said delayed first pulse and said second pulse of each pulse pair and providing an output control signal during coincidence thereof, a second delay circuit means responsive to said output control signal for imposing a slight delay on said output control signal, said slight delay being substantially less than the spacing between the signals of said signal pairs, and a trigger circuit reponsive to said delayed control signal which occurs for each signal pair for providing said trigger pulses, and switching means coupled to said input and coupled with said trigger circuit means for providing output signals during the peak of each of the second signals of said signal pairs, said switching circuit being responsive to said trigger pulses for passing only the peaks of said second signals of said signal pairs to provide said output signal which follows the peak amplitude of the second signals of the signal pairs.

4. A circuit as in claim 3 wherein said trigger circuit means includes second level detector means coupled between said input and said trigger circuit to gate the output control signals from said second delay circuit to said trigger circuit, said second level detector means providing gating signals only when the first signals of the pairs reach a predetermined high level.

5. A circuit as in claim 4 wherein said predetermined high level is ninety percent of the normal level of said first signals of the signal pairs.

6. A circuit for measuring the amplitude of plural signals occurring in signal pairs having a predetermined spacing between the signals of each pair wherein the first signal of each pair is utilized to sample the amplitude of the second signal of each pair for providing an output signal which follows the peak amplitude of the second signals of the pairs comprising an input for receiving said plural signal pairs, level detector means coupled with said input for receiving said signal pairs and providing standardized pulse pairs respectively corresponding to said signal pairs, delay circuit means coupled with said level detector means for receiving the output of said level detector means and delaying each first pulse of the pulse pairs by a delay slightly greater than said predetermined spacing between said signals to cause each delayed first pulse to occur after the leading edge but before the peak of each respective second signal of each signal pair, trigger circuit means coupled with said delay circuit means to receive said delayed first pulses and to generate trigger pulses respectively bracketing the peaks of the second signals of the signal pairs, and switching and storage means coupled to said input and coupled with said trigger circuit means for providing output signals during the peak of each of the second signals of said signal pairs, said switching and storage means being responsive to said trigger pulses for passing the peaks of said second signals of said signal pairs to provide said output signal which follows the peak amplitude of the second signals of the pairs.

7. A circuit for measuring the amplitude of plural signals, each signal having a predetermined duration, wherein a trigger pulse is generated in response to each signal for sampling the peak amplitude of each such signal comprising an input for receiving said plural signals, delay circuit means coupled with said input for receiving said signals and for delaying each signal by a delay less than one-half the duration of each signal to provide output control pulses having leading edges occurring shortly before the peak of each respective signal, trigger circuit means coupled with said delay circuit means to receive said control pulses and to provide trigger pulses which respectively bracket the peaks of the signals, switching means coupled to said input and coupled with said trigger circuit means for providing output signals during the peak of each of said input signals, said switching circuit means being responsive to said trigger pulses for passing only the peaks of said signals, and storage means coupled with said switching means for receiving the peaks of said signals and providing said output signal which follows the peak amplitude of said input signals.

8. A method of providing an output waveform having an amplitude corresponding to the peak amplitude of second signals of signal pairs which have a predetermined spacing between the signals of each pair, while discriminating against individual signals and noise, comprising the steps of delaying the first signal of each signal pair a delay slightly less than said predetermined spacing between said signals to cause the delayed first signal to bracket the leading edge of each respective second signal of each pair, generating a first control pulse having a duration between the leading edge of the second signal and the trailing edge of the delayed first signal of each pair, generating a second control pulse in response to each first control pulse, each second control pulse bracketing the peak of the respective second signal of said signal pairs, and gating and storing the peak amplitude of the second signal of each signal pair during the duration of the respective second control pulses.

9. A method of providing an output waveform having an amplitude corresponding to the peak amplitude of second signals of signal pairs which have a predetermined spacing between the signals of each pair, while discriminating against individual signals and noise, comprising the steps of delaying the first signal of each signal pair a delay slightly less than said predetermined spacing between said signals to cause the delayed first signal to bracket the leading edge of each respective second signal of each pair, generating a first control pulse having a duration between the leading edge of the second signal and the trailing edge of the delayed first signal of each pair, generating a second control pulse in response to each first control pulse, each second control pulse bracketing the peak of the respective second signal of said signal pairs, and gating and storing the peak amplitude of the second signal of each signal pair during the duration of the respective second control pulses, the stored peak amplitude of said second signals being applied as a feedback signal to a receiver for controlling the gain of said receiver.

10. A method of providing an output waveform having an amplitude corresponding to the peak amplitude of second signals of signal pairs which have a predetermined spacing between the signals of each pair, while discriminating against individual signals and noise, comprising the steps of delaying the first signal of each signal pair by a delay slightly less than said predetermined spacing between said signals to cause the delayed first signal to bracket the leading edge of each respective second signal of each pair, generating a first control pulse during coincidence of the second signal and the delayed first signal of each pair, generating a second control pulse in response to each first control pulse, each second control pulse bracketing the peak of the respective second signal of said signal pairs, generating a gate signal upon coincidence of each second control pulse and occurrence of each first signal of the pairs reaching a predetermined level, and gating and storing the peak amplitude of the second signal of each signal pair upon the occurrence of the respective gate signals, the stored peak amplitude of said second signals being applied as a feedback signal to a receiver for controlling the gain of said receiver.

References Cited

UNITED STATES PATENTS

| | | | |
|---|---|---|---|
| 2,462,110 | 2/1949 | Levy | 250—27 |
| 3,072,855 | 1/1963 | Chandler | 328—165 |
| 3,322,974 | 5/1967 | Ahrons et al. | 307—304 X |
| 3,051,928 | 8/1962 | Sullivan | 328—119 X |

JOHN S. HEYMAN, Primary Examiner

R. L. WOODBRIDGE, Assistant Examiner

U.S. Cl. X.R.

250—27; 307—304; 328—119, 165